Patented Feb. 14, 1939

2,146,715

UNITED STATES PATENT OFFICE 2,146,715

IRRITANT COMPOUNDS

Maurice E. Barker and Charles E. Danner, Edgewood Arsenal, Md., assignors to Patrick J. Hurley, Secretary of War of the United States of America and his successors in office No Drawing. Application September 23, 1932, Serial No. 634,570

11 Claims. (Cl. 167—47)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to compounds for producing irritant and toxic gases and more particularly has reference to a compound for increasing the effectiveness of such agents while maintaining the compound stable for long periods even at elevated temperatures.

Powerfully irritant and lacrimatory substances are known and have been extensively used for their specific properties. Among such substances is a solid lacrimatory material, phenylchlormethyl ketone ($C_6H_5COCH_2Cl$), commonly called chloracetophenone, which is soluble in a highly irritant liquid trichlornitromethane ($Cl_3CNO_2$), commonly caled chlorpicrin. Either of these compounds may be used alone or a solution of chloracetophenone in chlorpicrin may be used. Such use is old in the art as similar compounds were used experimentally and on the battlefields during the World War.

Chloracetophenone has a boiling point of 247° C. and it is therefore exceedingly difficult to get the air saturated with the vapor thereof either by burning or by explosion. Lethal concentrations of chlorpicrin are also not readily obtainable in the air, since this compound boils at 112° C., hence its rate of evaporation is very slow.

Chlorpicrin under some conditions, when used alone or when used as a solvent for chloracetophenone, is decomposed by the explosive charge of artillery shells and thus loses its irritant effect.

An object of this invention is to provide a process for accelerating and increasing the effectiveness of chloracetophenone and chlorpicrin as toxic and irritant substances.

Another object of this invention is to provide a toxic and lacrimating compound and including an activating substance which causes the body to become more susceptible to the toxic and lacrimator.

Another object of this invention is to provide a toxic and lacrimatory compound including chlorpicrin and a stabilizing compound which prevents decomposition of the chlorpicrin by the explosive charge of artillery shell.

Another object of this invention is to provide a compound suitable as a lacrimatory substance and/or a toxic substance and an activating substance which renders the human body more susceptible to the lacrimator and/or toxic and which furthermore increases the atomization of the irritants.

A further object of this invention is to provide a toxic and/or irritating compound whereby the air may be readily saturated with toxics and/or irritants having comparatively high boiling points.

A further object of this invention is to provide a process for obtaining high non-persistent concentrations of heretofore persistent irritant and toxic gases.

This application is a continuation-in-part of our application Serial Number 308,335 filed September 25, 1928, for "Irritant gas".

With these and other objects in view, which may be incident thereto, the present invention consists in the substances and equivalents thereof hereinafter set forth and claimed, with the understanding that the several necessary substances comprising this invention may be varied in proportion and composition without departing from the spirit and scope of the appended claims.

Chloracetophenone is the most powerful lacrimatory compound of the halogen derivatives of the mixed ketones. A number of hydrocarbons such as trichlorethylene, carbon tetrachloride, benzene, nitrobenzene, gasoline, kerosene, and other compounds, have been used as solvents for chloracetophenone. We have found that chloroform (trichloromethane) $CHCl_3$ is a better solvent for chloracetophenone than any heretofore used.

The following solvents have been determined to be the best carriers under normal conditions:

| Solvents | Grams of chloracetophenone per hundred cc. of saturated solution at 22° C. |
|---|---|
| Chloroform | 61.29 |
| Chloracetone | 59.40 |
| Nitrobenzene | 58.18 |
| Benzene | 50.94 |
| Benzylchloride | 45.92 |
| Chlorobenzene | 44.85 |

When a solution of chloroform and chloracetophenone is allowed to evaporate, a very considerable concentration of chloracetophenone is formed in the air. If the solution is exploded in the atmosphere, exceedingly high concentrations are set up so that the air is saturated with the vapor, and, in addition, a very considerable concentration is suspended as solid particles of chloracetophenone, due to the evaporation of each minute droplet of chloroform freeing the core of chloracetophenone. It is apparent that the solution may be disseminated with a high degree of efficiency with the production of any desired concentration depending upon the strength of the solution and the method of dispersing.

Chlorpicrin (trichloronitromethane), prepared by distilling nitro compounds such as picric acid with bleaching powder solution, or by prolonged heating of chloroform with fuming nitric acid, normally a lethal gas, is a powerful lacrimatory agent and is also irritating to the mucous membrane at a concentration of .019 mg/1. Chlorpicrin, having a high boiling point of 112° C., has a slow rate of evaporation, making it difficult to obtain a toxic concentration in air. When dispersed in the usual manner, this substance is very persistent and not widely disseminated.

We have found that chlorpicrin is mutually soluble in all proportions with chloroform. When mixed in substantially equal parts the entire quantity of chlorpicrin in the solution may be disseminated into the air in a non-persistent heavy concentration as an irritating agent, or when the amount of chlorpicrin in solution is increased, a toxic concentration for dispersion may be readily attained. The chloroform acts as a diluent for the chlorpicrin and prevents decomposition thereof by the explosive charges of artillery shells.

We have also found that a solvent made up of approximately equal volumes of chlorpicrin and chloroform dissolves about 40% by weight of chloracetophenone at room temperatures. Such a solution is stable for long periods of time even at elevated temperatures and, when disseminated into the air by spray action or explosive force, breaks up into very small droplets which have a large evaporating surface. This compound, either in liquid or vapor form, causes intense eye irritation followed by a copious flow of tears. In addition, violent though temporary skin itching is produced. This substance produces violent irritation at a concentration which has no danger either to health or life.

Various proportions of chloracetophenone may be dissolved in the chloroform-chlorpicrin solution. Generally, from 20 to 40% by weight of chloracetophenone gives excellent results as a fumigant and as a war gas, though other proportions may be made, depending upon the effects desired.

The chloroform in these compositions, in addition to being an excellent solvent and assisting in atomization and vaporization, also causes a more vigorous as well as quicker irritation on the human eye, nose, and skin, due to its activation of the pores. The presence of chloroform in such a solution reduces the viscosity and the boiling point of the solution and increases the fluidity thereby increasing the ease of atomization of such a solution, thus rendering such lacrimatory and toxic solutions doubly effective when sprayed under pressure or when disseminated as a filling for explosive munitions such as hand grenades or artillery projectiles.

Both chloroform and chlorpicrin are exceedingly poisonous to insect life, so that a solution of the two may be atomized by any common method as well as by explosion and the gas formed is an exceedingly effective fumigating agent. A solution of chloracetophenone, chlorpicrin, and chloroform in approximately the proportions named affords an excellent fumigating agent as well as a lacrimatory and irritant agent which will ordinarily not permanently disable persons exposed, though a lethal concentration may be readily obtained by increasing the amount of chlorpicrin.

The compositions forming the subject of this invention are useful in war to produce a harassing action on an enemy. Likewise, they may be used for curbing criminals and for mob control or in fixed installations as a protection against burglars; or they may be used as warning agents against deadly gases such as carbon monoxide, which have no characteristic odor or warning action of their own.

While we have described the preferred embodiments of this invention, it should be understood that the invention is not confined to the precise components and proportions herein set forth by way of illustration, as it is apparent that many variations may be made therein by those skilled in the art without departing from the spirit of the invention or exceeding the scope of the appended claims.

We claim:

1. A composition of matter for producing a lacrimatory and irritant effect on the human body comprising 20%–40% by weight of chloracetophenone in a solvent containing substantially equal volumes of chloroform and chlorpicrin.

2. A composition of matter producing irritating and nauseating effect upon the human body comprising a solution of substantially equal parts of chlorpicrin and chloroform, whereby the chloroform renders the human body more susceptible to the chlorpicrin.

3. A composition of irritating and disabling agents consisting of a comparatively volatile component and a relatively less volatile, more persistent component combined in such a manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time.

4. A composition of irritating and disabling agents consisting of a comparatively volatile component and a relatively less volatile, more persistent component combined in such a manner that a predetermined high initial concentration composed by said comparatively volatile component will be formed when said composition is projected and a residue composed by said relatively less volatile, more persistent component will be left which will be dispersed at a comparatively slow rate to maintain an irritating and disabling atmosphere at desired high concentration as and when the concentration composed by said comparatively volatile component disappears and for a long period of time thereafter.

5. A composition of irritating and disabling agents consisting of chloropicrin and chloracetophenone.

6. A composition of irritating and disabling agents consisting of a comparatively volatile component, a relatively less volatile, more persistent component, and a solvent, the whole combined in such a manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time.

7. A composition of irritating and disabling agents consisting of a comparatively volatile component, a relatively less volatile, more persistent component, and a solvent more volatile than said comparatively volatile component, the whole combined in such a manner that a predetermined high initial concentration composed by said comparatively volatile component will be formed at least partially with the aid of said solvent when said composition is projected and a residue composed by said relatively less volatile, more persistent component will be left which will be dispersed at a comparatively slow rate to maintain an irritating and disabling atmosphere at desired high concentration as and when the concentration composed by said comparatively volatile component disappears and for a long time thereafter.

8. A composition of irritating and disabling agents consisting of chloropicrin and chloracetophenone dissolved in a suitable solvent.

9. A composition of irritating and disabling agents consisting of chloropicrin, chloracetophenone, and a chloro-methane compound.

10. A composition of irritating and disabling agents consisting of a comparatively volatile component, a relatively less volatile, more persistent component, and a solvent, the whole combined in such manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time, and said solvent exerting a regulatory effect on the vapor pressures and the evaporation of said irritating and disabling agents.

11. A composition of irritating and disabling agents consisting of chloropicrin, chloracetophenone, and a solvent, said solvent exerting a regulatory effect on the vapor pressures and the evaporation of said irritating and disabling agents.

MAURICE E. BARKER.
CHARLES E. DANNER.

CERTIFICATE OF CORRECTION.

Patent No. 2,146,715. February 14, 1939.

MAURICE E. BARKER, ET AL.

It is hereby certified that the above numbered patent was erroneously issued to Patrick J. Hurley, Secretary of War of the United States of America and his successors in office, as assignee, whereas said patent should have been issued to the inventors, said Maurice E. Barker and Charles E. Danner, granting a non-exclusive license to the United States Government, as shown by the records of this office; and that the said Letters Patent should be read with this correction therein that the same may conform to the record of the case in the Patent Office.

Signed and sealed this 28th day of March, A. D. 1939.

Henry Van Arsdale.

(Seal) Acting Commissioner of Patents.

high initial concentration composed by said comparatively volatile component will be formed at least partially with the aid of said solvent when said composition is projected and a residue composed by said relatively less volatile, more persistent component will be left which will be dispersed at a comparatively slow rate to maintain an irritating and disabling atmosphere at desired high concentration as and when the concentration composed by said comparatively volatile component disappears and for a long time thereafter.

8. A composition of irritating and disabling agents consisting of chloropicrin and chloracetophenone dissolved in a suitable solvent.

9. A composition of irritating and disabling agents consisting of chloropicrin, chloracetophenone, and a chloro-methane compound.

10. A composition of irritating and disabling agents consisting of a comparatively volatile component, a relatively less volatile, more persistent component, and a solvent, the whole combined in such manner that a predetermined high initial concentration of deterrent agencies will be formed when said composition is projected and a residue will be left which will be dispersed at a comparatively slow rate to maintain an irritating and disabling atmosphere at desired high concentration for a relatively long period of time, and said solvent exerting a regulatory effect on the vapor pressures and the evaporation of said irritating and disabling agents.

11. A composition of irritating and disabling agents consisting of chloropicrin, chloracetophenone, and a solvent, said solvent exerting a regulatory effect on the vapor pressures and the evaporation of said irritating and disabling agents.

MAURICE E. BARKER.
CHARLES E. DANNER.

CERTIFICATE OF CORRECTION.

Patent No. 2,146,715. February 14, 1939.

MAURICE E. BARKER, ET AL.

It is hereby certified that the above numbered patent was erroneously issued to Patrick J. Hurley, Secretary of War of the United States of America and his successors in office, as assignee, whereas said patent should have been issued to the inventors, said Maurice E. Barker and Charles E. Danner, granting a non-exclusive license to the United States Government, as shown by the records of this office; and that the said Letters Patent should be read with this correction therein that the same may conform to the record of the case in the Patent Office.

Signed and sealed this 28th day of March, A. D. 1939.

Henry Van Arsdale.

(Seal) Acting Commissioner of Patents.